(12) United States Patent
Luo et al.

(10) Patent No.: US 6,576,725 B1
(45) Date of Patent: Jun. 10, 2003

(54) IRON-BASED CATALYST FOR PRODUCING HIGH-VINYL POLYBUTADIENE

(75) Inventors: Steven Luo, Akron, OH (US); Michael W. Hayes, Canton, OH (US); Dennis R. Brumbaugh, North Canton, OH (US); David E. Zak, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/053,730

(22) Filed: Jan. 18, 2002

(51) Int. Cl.$^7$ ................................................ C08F 4/609
(52) U.S. Cl. .................... 526/139; 526/169.1; 526/335; 502/117; 502/121; 502/155; 502/162
(58) Field of Search .............................. 526/139, 169.1, 526/171, 335; 502/117, 121, 155, 162

(56) References Cited

U.S. PATENT DOCUMENTS

| | | | |
|---|---|---|---|
| 3,419,505 A | 12/1968 | Marsico | 260/2 |
| 3,457,186 A | 7/1969 | Marsico | 252/429 |
| 3,457,250 A | 7/1969 | Gaeth | 260/94.3 |
| 3,498,963 A | 3/1970 | Ichikawa et al. | 260/94.3 |
| 3,535,303 A * | 10/1970 | Ichikawa et al. | 526/139 |
| 3,725,373 A | 4/1973 | Yoo | 260/88.7 |
| 3,778,424 A | 12/1973 | Suginura et al. | 260/94.3 |
| 3,957,894 A | 5/1976 | Saeki et al. | 260/666 |
| 4,048,418 A | 9/1977 | Throckmorton | 526/138 |
| 4,168,357 A | 9/1979 | Throckmorton et al. | 526/139 |
| 4,168,374 A | 9/1979 | Throckmorton et al. | 526/139 |
| 4,182,813 A | 1/1980 | Makino et al. | 526/92 |
| 4,751,275 A | 6/1988 | Witte et al. | 526/139 |
| 4,954,125 A * | 9/1990 | Ono et al. | 526/139 X |
| 5,239,023 A | 8/1993 | Hsu et al. | 526/141 |
| 5,356,997 A | 10/1994 | Massie, II et al. | 525/237 |
| 5,677,405 A | 10/1997 | Goodall et al. | 526/281 |
| 5,891,963 A | 4/1999 | Brookhart et al. | 525/326.1 |
| 5,919,875 A | 7/1999 | Luo et al. | 526/139 |
| 6,117,956 A | 9/2000 | Luo | 526/145 |
| 6,160,063 A | 12/2000 | Luo | 526/139 |
| 6,180,734 B1 | 1/2001 | Luo | 526/139 |
| 6,197,888 B1 | 3/2001 | Luo | 525/247 |
| 6,201,080 B1 | 3/2001 | Luo et al. | 526/139 |
| 6,211,313 B1 | 4/2001 | Luo | 526/139 |
| 6,277,779 B1 | 8/2001 | Luo | 502/154 |
| 6,281,305 B1 | 8/2001 | Luo | 526/139 |
| 6,284,702 B1 | 9/2001 | Luo | 502/154 |
| 6,288,183 B1 | 9/2001 | Luo | 526/153 |
| 6,320,004 B1 | 11/2001 | Luo | 526/126 |
| 6,331,594 B2 | 12/2001 | Luo | 525/247 |
| 2001/0007000 A1 | 7/2001 | Luo | 525/247 |
| 2001/0012878 A1 | 8/2001 | Luo | 526/139 |

FOREIGN PATENT DOCUMENTS

| | | |
|---|---|---|
| EP | 0 994 129 A1 | 4/2000 |
| WO | 00/75201 A1 | 12/2000 |
| WO | 01/32724 A1 | 5/2001 |

OTHER PUBLICATIONS

English Abstract of Japanese Patent No. 45011154.
English Abstract of Japanese Patent No. 48064178.
English Abstract of Japanese Patent No. 73006939.
Syndiotactic 1,2–Polybutadiene with Co–CS2 Catalyst System I. Preparation Properties and Application of Highly Crystalline Syndiotactic 1,2–Polybutadiene, II. Catalyst for Stereospecific Polymerization of Butadiene to Syndiotactic 1,2–Polybutadiene, III. 1H and 13C–NMR Study of Highly Syndiotactic 1,2–Polybutadiene and IV Mechanism of Syndiotactic Polymerization of Butadiene with Cobalt Compounds–Organoalumim–CS2, Journal of Polymer Science: Polymer Chemistry Edition, by H. Ashitaka et al., vol. 21, pp. 1853–1860 and 1951–1995, (1983).
Comprehensive Polymer Science, by Porri and Giarrusso, Pergamon Press, Oxford, vol. 4, p. 53, (1989).

* cited by examiner

*Primary Examiner*—Fred Teskin
(74) *Attorney, Agent, or Firm*—Arthur M. Reginelli; Tim Krogh

(57) ABSTRACT

A catalyst composition that is the combination of or the reaction product of ingredients comprising an iron-containing compound, an organomagnesium compound, and an α-acylphosphonate diester.

20 Claims, No Drawings

IRON-BASED CATALYST FOR PRODUCING HIGH-VINYL POLYBUTADIENE

FIELD OF THE INVENTION

This invention relates to an iron-based catalyst composition for preparing high-vinyl conjugated diene polymers.

BACKGROUND OF THE INVENTION

High-vinyl polybutadiene, also called 1,2-polybutadiene, is typically characterized by having greater than about 60% of its monomeric units in the 1,2-(vinyl) configuration. Two forms of commercially useful high-vinyl polybutadiene include syndiotactic 1,2-polybutadiene and atactic 1,2-polybutadiene.

Syndiotactic 1,2-polybutadiene has a stereoregular structure in which the side-chain vinyl groups are located alternately on the opposite sides in relation to the polymeric main chain. Due to its stereoregular structure, syndiotactic 1,2-polybutadiene is a crystalline thermoplastic resin and has a melting temperature within the range of about 80° C. to about 215° C., depending on the 1,2-linkage content and syndiotacticity. For processability reasons, it is generally desirable for syndiotactic 1,2-polybutadiene to have a melting temperature of less than about 190° C.

Syndiotactic 1,2-polybutadiene uniquely exhibits the properties of both plastics and rubber, and therefore it has many uses. For example, films, fibers, and various molded articles can be made from syndiotactic 1,2-polybutadiene. It can also be blended into and co-cured with natural or synthetic rubbers in order to improve the properties thereof. Various transition metal catalyst systems based on cobalt, titanium, vanadium, chromium, and molybdenum for preparing syndiotactic 1,2-polybutadiene have been reported. The majority of these catalyst systems, however, have no practical utility because they have low catalytic activity or poor stereoselectivity, and in some cases they produce low molecular weight polymers or partially crosslinked polymers unsuitable for commercial use.

Atactic 1,2-polybutadiene has a stereoirregular structure in which the side-chain vinyl groups are located randomly on the opposite sides in relation to the polymeric main chain. Due to its stereoirregular structure, atactic 1,2-polybutadiene is an amorphous rubbery elastomer and is typically characterized by having a glass transition temperature from about −50° C. to about 0° C. without a readily detectable melting temperature. Atactic 1,2-polybutadiene is utilized in a variety of applications. For example, atactic 1,2-polybutadiene is useful in tire tread compositions because it provides a good balance of traction and rolling resistance.

Atactic 1,2-polybutadiene is commonly produced by anionic polymerization utilizing alkyllithium initiators which are modified with Lewis base modifiers such as chelating diamines, ethers, tertiary amines, acetals, ketals, and compounds of similar structures. The vinyl content of polybutadiene prepared utilizing these Lewis base modifiers decreases drastically as the polymerization temperature is increased. For this reason, it is difficult to prepare atactic 1,2-polybutadiene at high polymerization temperatures utilizing Lewis base modifiers. However, since high polymerization temperatures generally promote a higher polymerization rate, it is often desirable to utilize moderately high temperatures in commercial polymerizations in order to maximize productivity as well as to reduce the production cost.

Because syndiotactic 1,2-polybutadiene and atactic 1,2-polybutadiene are useful products and the catalysts known heretofore in the art have many shortcomings, it would be advantageous to develop new and significantly improved catalyst compositions that have high catalytic activity and stereoselectivity for polymerizing 1,3-butadiene into syndiotactic 1,2-polybutadiene or atactic 1,2-polybutadiene.

SUMMARY OF THE INVENTION

In general the present invention provides a catalyst composition that is the combination of or the reaction product of ingredients comprising an iron-containing compound, an organomagnesium compound, and an α-acylphosphonate diester.

The present invention also includes a catalyst composition formed by a process comprising the step of combining an iron-containing compound, an organomagnesium compound, and an α-acylphosphonate diester.

The present invention further provides process for forming conjugated diene polymers comprising the step of polymerizing conjugated diene monomers in the presence of a catalytically effective amount of a catalyst composition formed by combining an iron-containing compound, an organomagnesium compound, and an α-acylphosphonate diester.

Advantageously, the catalyst composition of the present invention has very high catalytic activity and stereoselectivity for polymerizing conjugated diene monomers such as 1,3-butadiene. This activity and selectivity, among other advantages, allows conjugated diene polymers such as syndiotactic 1,2-polybutadiene and atactic 1,2-polybutadiene to be produced in high yields with low catalyst levels after relatively short polymerization times. In addition, the iron-containing compounds that are utilized in the catalyst composition of this invention are generally stable, inexpensive, relatively innocuous, and readily available. Further, the catalyst composition of this invention has high catalytic activity in a wide variety of solvents including the environmentally-preferred nonhalogenated solvents such as aliphatic and cycloaliphatic hydrocarbons. Furthermore, this catalyst composition is operational over a wide range of polymerization temperatures. Still further, the performance characteristics of the catalyst composition can be readily controlled by changing the steric and electronic characteristics of the organic substituents of the α-acylphosphonate diester.

DETAILED DESCRIPTION OF ILLUSTRATIVE EMBODIMENTS

The catalyst composition is formed by combining (a) an iron-containing compound, (b) an organomagnesium compound, and (c) an α-acylphosphonate diester. In addition to the three catalyst ingredients (a), (b), and (c), other organometallic compounds or Lewis bases can also be added, if desired.

Various iron-containing compounds or mixtures thereof can be employed as ingredient (a). Iron-containing compounds that are soluble in a hydrocarbon solvent such as aromatic hydrocarbons, aliphatic hydrocarbons, or cycloaliphatic hydrocarbons are advantageously employed. Hydrocarbon-insoluble iron-containing compounds, however, can be suspended in the polymerization medium to form the catalytically active species and are therefore also useful.

The iron atom in the iron-containing compounds can be in various oxidation states including but not limited to the 0, +2, +3, and +4 oxidation states. Divalent iron compounds (also called ferrous compounds), wherein the iron atom is in the +2 oxidation state, and trivalent iron compounds (also called ferric compounds), wherein the iron atom is in the +3 oxidation state, are generally preferred. Suitable iron-containing compounds include, but are not limited to, iron carboxylates, iron organophosphates, iron organophosphonates, iron organophosphinates, iron carbamates, iron dithiocarbamates, iron xanthates, iron β-diketonates, iron alkoxides or aryloxides, iron halides, iron pseudo-halides, iron oxyhalides, and organoiron compounds.

Suitable iron carboxylates include iron(II) formate, iron(III) formate, iron(II) acetate, iron(III) acetate, iron(II) acrylate, iron(III) acrylate, iron(II) methacrylate, iron(III) methacrylate, iron(II) valerate, iron(III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Suitable iron organophosphates include iron(II) dibutyl phosphate, iron(III) dibutyl phosphate, iron(II) dipentyl phosphate, iron(III) dipentyl phosphate, iron(II) dihexyl phosphate, iron(III) dihexyl phosphate, iron(II) diheptyl phosphate, iron(III) diheptyl phosphate, iron(II) dioctyl phosphate, iron(III) dioctyl phosphate, iron(II) bis(1-methylheptyl) phosphate, iron(III) bis(1-methylheptyl) phosphate, iron(II) bis(2-ethylhexyl) phosphate, iron(III) bis(2-ethylhexyl) phosphate, iron(II) didecyl phosphate, iron(III) didecyl phosphate, iron(II) didodecyl phosphate, iron(III) didodecyl phosphate, iron(II) dioctadecyl phosphate, iron(III) dioctadecyl phosphate, iron(II) dioleyl phosphate, iron(III) dioleyl phosphate, iron(II) diphenyl phosphate, iron(III) diphenyl phosphate, iron(II) bis(p-nonylphenyl) phosphate, iron(III) bis(p-nonylphenyl) phosphate, iron(II) butyl (2-ethylhexyl) phosphate, iron(III) butyl (2-ethylhexyl) phosphate, iron(II) (1-methylheptyl) (2-ethylhexyl) phosphate, iron(III) (1-methylheptyl) (2-ethylhexyl) phosphate, iron(II) (2-ethylhexyl) (p-nonylphenyl) phosphate, and iron(III) (2-ethylhexyl) (p-nonylphenyl) phosphate.

Suitable iron organophosphonates include iron(II) butyl phosphonate, iron(III) butyl phosphonate, iron(II) pentyl phosphonate, iron(III) pentyl phosphonate, iron(II) hexyl phosphonate, iron(III) hexyl phosphonate, iron(II) heptyl phosphonate, iron(III) heptyl phosphonate, iron(II) octyl phosphonate, iron(III) octyl phosphonate, iron(II) (1-methylheptyl) phosphonate, iron(III) (1-methylheptyl) phosphonate, iron(II) (2-ethylhexyl) phosphonate, iron(III) (2-ethylhexyl) phosphonate, iron(II) decyl phosphonate, iron(III) decyl phosphonate, iron(II) dodecyl phosphonate, iron(III) dodecyl phosphonate, iron(II) octadecyl phosphonate, iron(III) octadecyl phosphonate, iron(II) oleyl phosphonate, iron(III) oleyl phosphonate, iron(II) phenyl phosphonate, iron(III) phenyl phosphonate, iron(II) (p-nonylphenyl) phosphonate, iron(III) (p-nonylphenyl) phosphonate, iron(II) butyl butylphosphonate, iron(III) butyl butylphosphonate, iron(II) pentyl pentylphosphonate, iron(III) pentyl pentylphosphonate, iron(II) hexyl hexylphosphonate, iron(III) hexyl hexylphosphonate, iron(II) heptyl heptylphosphonate, iron(III) heptyl heptylphosphonate, iron(II) octyl octylphosphonate, iron(III) octyl octylphosphonate, iron(II) (1-methylheptyl) (1-methylheptyl)phosphonate, iron(III) (1-methylheptyl) (1-methylheptyl)phosphonate, iron(II) (2-ethylhexyl) (2-ethylhexyl)phosphonate, iron(III) (2-ethylhexyl) (2-ethylhexyl)phosphonate, iron(II) decyl decylphosphonate, iron(III) decyl decylphosphonate, iron(II) dodecyl dodecylphosphonate, iron(III) dodecyl dodecylphosphonate, iron(II) octadecyl octadecylphosphonate, iron(III) octadecyl octadecylphosphonate, iron(II) oleyl oleylphosphonate, iron(III) oleyl oleylphosphonate, iron(II) phenyl phenylphosphonate, iron(III) phenyl phenylphosphonate, iron(II) (p-nonylphenyl) (p-nonylphenyl)phosphonate, iron(III) (p-nonylphenyl) (p-nonylphenyl)phosphonate, iron(II) butyl (2-ethylhexyl)phosphonate, iron(III) butyl (2-ethylhexyl)phosphonate, iron(II) (2-ethylhexyl) butylphosphonate, iron(III) (2-ethylhexyl) butylphosphonate, iron(II) (1-methylheptyl) (2-ethylhexyl) phosphonate, iron(III) (1-methylheptyl) (2-ethylhexyl) phosphonate, iron(II) (2-ethylhexyl) (1-methylheptyl) phosphonate, iron(III) (2-ethylhexyl) (1-methylheptyl) phosphonate, iron(II) (2-ethylhexyl) (p-nonylphenyl) phosphonate, iron(III) (2-ethylhexyl) (p-nonylphenyl) phosphonate, iron(II) (p-nonylphenyl) (2-ethylhexyl) phosphonate, and iron(III) (p-nonylphenyl) (2-ethylhexyl) phosphonate. Suitable iron organophosphinates include iron(II) butylphosphinate, iron(III) butylphosphinate, iron(II) pentylphosphinate, iron(III) pentylphosphinate, iron(II) hexylphosphinate, iron(III) hexylphosphinate, iron(II) heptylphosphinate, iron(III) heptylphosphinate, iron(II) octylphosphinate, iron(III) octylphosphinate, iron(II) (1-methylheptyl)phosphinate, iron(III) (1-methylheptyl) phosphinate, iron(II) (2-ethylhexyl) phosphinate, iron(III) (2-ethylhexyl) phosphinate, iron(II) decylphosphinate, iron(III) decylphosphinate, iron(II) dodecylphosphinate, iron(III) dodecylphosphinate, iron(II) octadecylphosphinate, iron(III) octadecylphosphinate, iron(II) oleylphosphinate, iron(III) oleylphosphinate, iron(II) phenylphosphinate, iron(III) phenylphosphinate, iron(II) (p-nonylphenyl) phosphinate, iron(III) (p-nonylphenyl)phosphinate, iron(II) dibutylphosphinate, iron(III) dibutylphosphinate, iron(II) dipentylphosphinate, iron(III) dipentylphosphinate, iron(II ) dihexylphosphinate, iron(III) dihexylphosphinate, iron(II) diheptylphosphinate, iron(III) diheptylphosphinate, iron(II) dioctylphosphinate, iron(III) dioctylphosphinate, iron(II) bis(1-methylheptyl) phosphinate, iron (III) bis(1-methylheptyl) phosphinate, iron (II) bis (2-ethylhexyl) phosphinate, iron (III) bis (2-ethylhexyl) phosphinate, iron (II) didecylphosphinate, iron(III) didecylphosphinate, iron (II) didodecylphosphinate, iron(III) didodecylphosphinate, iron(II) dioctadecylphosphinate, iron(III) dioctadecylphosphinate, iron(II) dioleylphosphinate, iron (III) dioleylphosphinate, iron(II) diphenylphosphinate, iron (III) diphenylphosphinate, iron(II) bis(p-nonylphenyl) phosphinate, iron(III) bis(p-nonylphenyl)phosphinate, iron (II) butyl (2-ethylhexyl) phosphinate, iron (III) butyl (2-ethylhexyl) phosphinate, iron (II) (1-methylheptyl) (2-ethylhexyl)phosphinate, iron(III) (1-methylheptyl) (2-ethylhexyl)phosphinate, iron (II) (2-ethylhexyl) (p-nonylphenyl)phosphinate, and iron(III) (2-ethylhexyl)(p-nonylphenyl)phosphinate.

Suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropylcarbamate, iron (II) dibutylcarbamate, iron(III) dibutylcarbamate, iron(II) dibenzylcarbamate, and iron(III) dibenzylcarbamate.

Suitable iron dithiocarbamates include iron(II) dimethyldithiocarbamate, iron(III) dimethyldithiocarbamate, iron(II) diethyldithiocarbamate, iron(III) diethyldithiocarbamate, iron(II) diisopropyldithiocarbamate, iron(III) diisopropyldithiocarbamate, iron(II) dibutyldithiocarbamate, iron(III) dibutyldithiocarbamate, iron(II) dibenzyldithiocarbamate, and iron(III) dibenzyldithiocarbamate.

Suitable iron xanthates include iron(II) methylxanthate, iron(III) methylxanthate, iron(II) ethylxanthate, iron(III) ethylxanthate, iron(II) isopropylxanthate, iron(III) isopropylxanthate, iron(II) butylxanthate, iron(III) butylxanthate, iron(II) benzylxanthate, and iron(III) benzylxanthate.

Suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron (III) benzoylacetonate, iron(II) 2,2,6,6-tetramethyl-3,5-heptanedionate, and iron (III) 2,2,6, 6-tetramethyl-3,5-heptanedionate.

Suitable iron alkoxides or aryloxides include iron(II) methoxide, iron(III) methoxide, iron(II) ethoxide, iron(III) ethoxide, iron(II) isopropoxide, iron(III) isopropoxide, iron (II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

Suitable iron halides include iron(II) fluoride, iron(III) fluoride, iron(II) chloride, iron(III) chloride, iron(II) bromide, iron(III) bromide, and iron(II) iodide. Suitable iron pseudo-halides include iron(II) cyanide, iron(III) cyanide, iron(II) cyanate, iron(III) cyanate, iron(II) thiocyanate, iron (III) thiocyanate, iron(II) azide, iron(III) azide, and iron(III) ferrocyanide (also called Prussian blue). Suitable iron oxyhalides include iron(III) oxychloride and iron(III) oxybromide.

The term "organoiron compound" refers to any iron compound containing at least one covalent iron-carbon bond. Suitable organoiron compounds include bis (cyclopentadienyl)iron(II) (also called ferrocene), bis (pentamethylcyclopentadienyl)iron(II) (also called decamethylferrocene), bis(pentadienyl)iron(II), bis(2,4-dimethylpentadienyl) iron(II), bis(allyl)dicarbonyliron(II), (cyclopentadienyl)(pentadienyl)iron(II), tetra(1-norbornyl) iron(IV), (trimethylenemethane)tricarbonyliron(II), bis (butadiene)carbonyliron(0), (butadiene)tricarbonyliron(0), and bis(cyclooctatetraene)iron (0).

Various organomagnesium compounds or mixtures thereof can be utilized as ingredient (b). As used herein, the term "organomagnesium compound" refers to any magnesium compound containing at least one covalent magnesium-carbon bond. Organomagnesium compounds that are soluble in a hydrocarbon solvent are preferred.

A preferred class of organomagnesium compounds that can be utilized is represented by the general formula $MgR^1_2$, where each $R^1$, which may be the same or different, is a mono-valent organic group that is attached to the magnesium atom via a carbon atom. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, boron, sulfur, and phosphorus atoms.

Specific examples of organomagnesium compounds that are represented by the general formula $MgR^1_2$ include dimethylmagnesium, diethylmagnesium, di-n-propylmagnesium, diisopropylmagnesium, di-n-butylmagnesium, di-sec-butylmagnesium, diisobutylmagnesium, di-t-butylmagnesium, di-n-hexylmagnesium, di-n-octylmagnesium, diphenylmagnesium, di-p-tolylmagnesium, and dibenzylmagnesium, and the like, and mixtures thereof. Commercial dibutylmagnesium is particularly useful due to its availability and its solubility in aliphatic and cycloaliphatic hydrocarbon solvents. Commercial dibutylmagnesium is actually an organometallic oligomer and is comprised of a mixture of n-butyl, sec-butyl, and n-octyl groups bonded to the magnesium atom.

Another preferred class of organomagnesium compounds is represented by the general formula $R^2MgX$, where $R^2$ is a mono-valent organic group that is attached to the magnesium atom via a carbon atom, and X is a hydrogen atom, a halogen atom, a carboxylate group, an alkoxide group, or an aryloxide group. Preferably, $R^2$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, boron, sulfur, and phosphorus atoms. Preferably, X is a carboxylate group, an alkoxide group, or an aryloxide group, with each group preferably containing 1 to 20 carbon atoms.

Suitable organomagnesium compounds that are represented by the general formula $R^2MgX$ include, but are not limited to, hydrocarbylmagnesium hydride, hydrocarbylmagnesium halide, hydrocarbylmagnesium carboxylate, hydrocarbylmagnesium alkoxide, hydrocarbylmagnesium aryloxide, and the like, and mixtures thereof.

Specific examples of organomagnesium compounds that are represented by the general formula $R^2MgX$ include methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, benzylmagnesium phenoxide, and the like, and mixtures thereof.

Useful α-acylphosphonate diesters that can be employed as ingredient (c) of the catalyst composition include acyclic α-acylphosphonate diesters, cyclic α-acylphosphonate diesters, and mixtures thereof. Acyclic α-acylphosphonate diesters may be represented by the following structure:

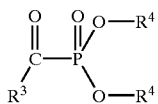

where $R^3$ is a hydrogen atom or a mono-valent organic group, and each $R^4$, which may be the same or different, is a mono-valent organic group. Preferably, $R^3$ and $R^4$ are hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, boron, sulfur, and phosphorus atoms.

α-Acylphosphonate diesters are known in the art and can be conveniently prepared by the Michaelis-Arbusov reactions of trihydrocarbyl phosphites with carboxylic acid halides or carboxylic acid anhydrides.

Suitable types of acyclic α-acylphosphonate diesters include, but are not limited to, dihydrocarbyl formylphosphonates, dihydrocarbyl acetylphosphonates, dihydrocarbyl propionylphosphonates, dihydrocarbyl butyrylphosphonates, dihydrocarbyl isobutyrylphosphonates, dihydrocarbyl pivaloylphosphonates, dihydrocarbyl 2-ethylhexanoylphosphonates, dihydrocarbyl cyclohexanoylphosphonates, dihydrocarbyl acryloylphosphonates, dihydrocarbyl methacryloylphosphonates, dihydrocarbyl crotonylphosphonates, dihydrocarbyl benzoylphosphonates, dihydrocarbyl toluoylphosphonates, dihydrocarbyl anisoylphosphonates, and dihydrocarbyl naphthoylphosphonates. Mixtures of the above acyclic α-acylphosphonate diesters may also be utilized.

Suitable dihydrocarbyl formylphosphonates include dimethyl formylphosphonate, diethyl formylphosphonate, di-n-propyl formylphosphonate diisopropyl formylphosphonate, di-n-butyl formylphosphonate, diisobutyl formylphosphonate, di-t-butyl formylphosphonate, bis(2,2,2-trifluoroethyl) formylphosphonate, bis (2,4-dimethyl-3-pentyl) formylphosphonate, bis(2-ethylhexyl) formylphosphonate, dineopentyl formylphosphonate, bis (cyclohexylmethyl) formylphosphonate, dibenzyl formylphosphonate, dicyclobutyl formylphosphonate, dicyclopentyl formylphosphonate, dicyclohexyl formylphosphonate, diphenyl formylphosphonate, ditolyl formylphosphonate, dinaphthyl formylphosphonate, dially formylphosphonate, dimethallyl forrnylphosphonate, and dicrotyl formylphosphonate.

Suitable dihydrocarbyl acetylphosphonates include dimethyl acetylphosphonate, diethyl acetylphosphonate, di-n-propyl acetylphosphonate diisopropyl acetylphosphonate, di-n-butyl acetylphosphonate, diisobutyl acetylphosphonate, di-t-butyl acetylphosphonate, bis (2,2,2-trifluoroethyl) acetylphosphonate, bis(2,4-dimethyl-3-pentyl) acetylphosphonate, bis(2-ethylhexyl) acetylphosphonate, dineopentyl acetylphosphonate, bis (cyclohexylmethyl) acetylphosphonate, dibenzyl acetylphosphonate, dicyclobutyl acetylphosphonate, dicyclopentyl acetylphosphonate, dicyclohexyl acetylphosphonate, diphenyl acetylphosphonate, ditolyl acetylphosphonate, dinaphthyl acetylphosphonate, dially acetylphosphonate, dimethallyl acetylphosphonate, and dicrotyl acetylphosphonate.

Suitable dihydrocarbyl propionylphosphonates include dimethyl propionylphosphonate, diethyl propionylphosphonate, di-n-propyl propionylphosphonate diisopropyl propionylphosphonate, di-n-butyl propionylphosphonate, diisobutyl propionylphosphonate, di-t-butyl propionylphosphonate, bis(2,2,2-trifluoroethyl) propionylphosphonate, bis(2,4-dimethyl-3-pentyl) propionylphosphonate, bis(2-ethylhexyl) propionylphosphonate, dineopentyl propionylphosphonate, bis(cyclohexylmethyl) propionylphosphonate, dibenzyl propionylphosphonate, dicyclobutyl propionylphosphonate, dicyclopentyl propionylphosphonate, dicyclohexyl propionylphosphonate, diphenyl propionylphosphonate, ditolyl propionylphosphonate, dinaphthyl propionylphosphonate, dially propionylphosphonate, dimethallyl propionylphosphonate, and dicrotyl propionylphosphonate.

Suitable dihydrocarbyl butyrylphosphonates include dimethyl butyrylphosphonate, diethyl butyrylphosphonate, di-n-propyl butyrylphosphonate diisopropyl butyrylphosphonate, di-n-butyl butyrylphosphonate, diisobutyl butyrylphosphonate, di-t-butyl butyrylphosphonate, bis (2,2,2-trifluoroethyl) butyrylphosphonate, bis(2,4-dimethyl-3-pentyl) butyrylphosphonate, bis(2-ethylhexyl) butyrylphosphonate, dineopentyl butyrylphosphonate, bis (cyclohexylmethyl) butyrylphosphonate, dibenzyl butyrylphosphonate, dicyclobutyl butyrylphosphonate, dicyclopentyl butyrylphosphonate, dicyclohexyl butyrylphosphonate, diphenyl butyrylphosphonate, ditolyl butyrylphosphonate, dinaphthyl butyrylphosphonate, dially butyrylphosphonate, dimethallyl butyrylphosphonate, and dicrotyl butyrylphosphonate.

Suitable dihydrocarbyl isobutyrylphosphonates include dimethyl isobutyrylphosphonate, diethyl isobutyrylphosphonate, di-n-propyl isobutyrylphosphonate diisopropyl isobutyrylphosphonate, di-n-butyl isobutyrylphosphonate, diisobutyl isobutyrylphosphonate, di-t-butyl isobutyrylphosphonate, bis(2,2,2-trifluoroethyl) isobutyrylphosphonate, bis(2,4-dimethyl-3-pentyl) isobutyrylphosphonate, bis(2-ethylhexyl) isobutyrylphosphonate, dineopentyl isobutyrylphosphonate, bis(cyclohexylmethyl) isobutyrylphosphonate, dibenzyl isobutyrylphosphonate, dicyclobutyl isobutyrylphosphonate, dicyclopentyl isobutyrylphosphonate, dicyclohexyl isobutyrylphosphonate, diphenyl isobutyrylphosphonate, ditolyl isobutyrylphosphonate, dinaphthyl isobutyrylphosphonate, dially isobutyrylphosphonate, dimethallyl isobutyrylphosphonate, and dicrotyl isobutyrylphosphonate.

Suitable dihydrocarbyl pivaloylphosphonates include dimethyl pivaloylphosphonate, diethyl pivaloylphosphonate, di-n-propyl pivaloylphosphonate diisopropyl pivaloylphosphonate, di-n-butyl pivaloylphosphonate, diisobutyl pivaloylphosphonate, di-t-butyl pivaloylphosphonate, bis(2,2,2-trifluoroethyl) pivaloylphosphonate, bis(2,4-dimethyl-3-pentyl) pivaloylphosphonate, bis(2-ethylhexyl) pivaloylphosphonate, dineopentyl pivaloylphosphonate, bis (cyclohexylmethyl) pivaloylphosphonate, dibenzyl pivaloylphosphonate, dicyclobutyl pivaloylphosphonate, dicyclopentyl pivaloylphosphonate, dicyclohexyl pivaloylphosphonate, diphenyl pivaloylphosphonate, ditolyl pivaloylphosphonate, dinaphthyl pivaloylphosphonate, dially pivaloylphosphonate, dimethallyl pivaloylphosphonate, and dicrotyl pivaloylphosphonate.

Suitable dihydrocarbyl 2-ethylhexanoylphosphonates include dimethyl 2-ethylhexanoylphosphonate, diethyl 2-ethylhexanoylphosphonate, di-n-propyl 2-ethylhexanoylphosphonate diisopropyl 2-ethylhexanoylphosphonate, di-n-butyl 2-ethylhexanoylphosphonate, diisobutyl 2-ethylhexanoylphosphonate, di-t-butyl 2-ethylhexanoylphosphonate, bis(2,2,2-trifluoroethyl) 2-ethylhexanoylphosphonate, bis(2,4-dimethyl-3-pentyl) 2-ethylhexanoylphosphonate, bis(2-ethylhexyl) 2-ethylhexanoylphosphonate, dineopentyl 2-ethylhexanoylphosphonate, bis(cyclohexylmethyl) 2-ethylhexanoylphosphonate, dibenzyl 2-ethylhexanoylphosphonate, dicyclobutyl 2-ethylhexanoylphosphonate, dicyclopentyl 2-ethylhexanoylphosphonate, dicyclohexyl 2-ethylhexanoylphosphonate, diphenyl 2-ethylhexanoylphosphonate, ditolyl 2-ethylhexanoylphosphonate, dinaphthyl 2-ethylhexanoylphosphonate, dially 2-ethylhexanoylphosphonate, dimethallyl 2-ethylhexanoylphosphonate, and dicrotyl 2-ethylhexanoylphosphonate.

Suitable dihydrocarbyl cyclohexanoylphosphonates include dimethyl cyclohexanoylphosphonate, diethyl cyclohexanoylphosphonate, di-n-propyl cyclohexanoylphosphonate diisopropyl cyclohexanoylphosphonate, di-n-butyl cyclohexanoylphosphonate, diisobutyl cyclohexanoylphosphonate, di-t-butyl cyclohexanoylphosphonate, bis(2,2,2-trifluoroethyl) cyclohexanoylphosphonate, bis(2,4-dimethyl-3-pentyl) cyclohexanoylphosphonate, bis(2-ethylhexyl) cyclohexanoylphosphonate, dineopentyl cyclohexanoylphosphonate, bis(cyclohexylmethyl) cyclohexanoylphosphonate, dibenzyl cyclohexanoylphosphonate, dicyclobutyl cyclohexanoylphosphonate, dicyclopentyl cyclohexanoylphosphonate, dicyclohexyl cyclohexanoylphosphonate, diphenyl cyclohexanoylphosphonate, ditolyl cyclohexanoylphosphonate, dinaphthyl cyclohexanoylphosphonate, dially cyclohexanoylphosphonate, dimethallyl cyclohexanoylphosphonate, and dicrotyl cyclohexanoylphosphonate.

Suitable dihydrocarbyl acryloylphosphonates include dimethyl acryloylphosphonate, diethyl acryloylphosphonate, di-n-propyl acryloylphosphonate diisopropyl acryloylphosphonate, di-n-butyl acryloylphosphonate, diisobutyl acryloylphosphonate, di-t-butyl acryloylphosphonate, bis(2,2,2-trifluoroethyl) acryloylphosphonate, bis(2,4-dimethyl-3-pentyl) acryloylphosphonate, bis(2-ethylhexyl) acryloylphosphonate, dineopentyl acryloylphosphonate, bis(cyclohexylmethyl) acryloylphosphonate, dibenzyl acryloylphosphonate, dicyclobutyl acryloylphosphonate, dicyclopentyl acryloylphosphonate, dicyclohexyl acryloylphosphonate, diphenyl acryloylphosphonate, ditolyl acryloylphosphonate, dinaphthyl acryloylphosphonate, dially acryloylphosphonate, dimethallyl acryloylphosphonate, and dicrotyl acryloylphosphonate.

Suitable dihydrocarbyl methacryloylphosphonates include dimethyl methacryloylphosphonate, diethyl methacryloylphosphonate, di-n-propyl methacryloylphosphonate diisopropyl methacryloylphosphonate, di-n-butyl methacryloylphosphonate, diisobutyl methacryloylphosphonate, di-t-butyl methacryloylphosphonate, bis(2,2,2-trifluoroethyl) methacryloylphosphonate, bis(2,4-dimethyl-3-pentyl) methacryloylphosphonate, bis(2-ethylhexyl) methacryloylphosphonate, dineopentyl methacryloylphosphonate, bis(cyclohexylmethyl) methacryloylphosphonate, dibenzyl methacryloylphosphonate, dicyclobutyl methacryloylphosphonate, dicyclopentyl methacryloylphosphonate, dicyclohexyl methacryloylphosphonate, diphenyl methacryloylphosphonate, ditolyl methacryloylphosphonate, dinaphthyl methacryloylphosphonate, dially methacryloylphosphonate, dimethallyl methacryloylphosphonate, and dicrotyl methacryloylphosphonate.

Suitable dihydrocarbyl crotonylphosphonates include dimethyl crotonylphosphonate, diethyl crotonylphosphonate, di-n-propyl crotonylphosphonate diisopropyl crotonylphosphonate, di-n-butyl crotonylphosphonate, diisobutyl crotonylphosphonate, di-t-butyl crotonylphosphonate, bis(2,2,2-trifluoroethyl) crotonylphosphonate, bis(2,4-dimethyl-3-pentyl) crotonylphosphonate, bis(2-ethylhexyl) crotonylphosphonate, dineopentyl crotonylphosphonate, bis(cyclohexylmethyl) crotonylphosphonate, dibenzyl crotonylphosphonate, dicyclobutyl crotonylphosphonate, dicyclopentyl crotonylphosphonate, dicyclohexyl crotonylphosphonate, diphenyl crotonylphosphonate, ditolyl crotonylphosphonate, dinaphthyl crotonylphosphonate, dially crotonylphosphonate, dimethallyl crotonylphosphonate, and dicrotyl crotonylphosphonate.

Suitable dihydrocarbyl benzoylphosphonates include dimethyl benzoylphosphonate, diethyl benzoylphosphonate, di-n-propyl benzoylphosphonate disopropyl benzoylphosphonate, di-n-butyl benzoylphosphonate, diisobutyl benzoylphosphonate, di-t-butyl benzoylphosphonate, bis(2,2,2-trifluoroethyl) benzoylphosphonate, bis(2,4-dimethyl-3-pentyl) benzoylphosphonate, bis(2-ethylhexyl) benzoylphosphonate, dineopentyl benzoylphosphonate, bis(cyclohexylmethyl) benzoylphosphonate, dibenzyl benzoylphosphonate, dicyclobutyl benzoylphosphonate, dicyclopentyl benzoylphosphonate, dicyclohexyl benzoylphosphonate, diphenyl benzoylphosphonate, ditolyl benzoylphosphonate, dinaphthyl benzoylphosphonate, dially benzoylphosphonate, dimethallyl benzoylphosphonate, and dicrotyl benzoylphosphonate.

Suitable dihydrocarbyl toluoylphosphonates include dimethyl toluoylphosphonate, diethyl toluoylphosphonate, di-n-propyl toluoylphosphonate diisopropyl toluoylphosphonate, di-n-butyl toluoylphosphonate, diisobutyl toluoylphosphonate, di-t-butyl toluoylphosphonate, bis(2,2,2-trifluoroethyl) toluoylphosphonate, bis(2,4-dimethyl-3-pentyl) toluoylphosphonate, bis(2-ethylhexyl) toluoylphosphonate, dineopentyl toluoylphosphonate, bis(cyclohexylmethyl) toluoylphosphonate, dibenzyl toluoylphosphonate, dicyclobutyl toluoylphosphonate, dicyclopentyl toluoylphosphonate, dicyclohexyl toluoylphosphonate, diphenyl toluoylphosphonate, ditolyl toluoylphosphonate, dinaphthyl toluoylphosphonate, dially toluoylphosphonate, dimethallyl toluoylphosphonate, and dicrotyl toluoylphosphonate.

Suitable dihydrocarbyl anisoylphosphonates include dimethyl anisoylphosphonate, diethyl anisoylphosphonate, di-n-propyl anisoylphosphonate diisopropyl anisoylphosphonate, di-n-butyl anisoylphosphonate, diisobutyl anisoylphosphonate, di-t-butyl anisoylphosphonate, bis(2,2, 2-trifluoroethyl) anisoylphosphonate, bis(2,4-dimethyl-3-pentyl) anisoylphosphonate, bis(2-ethylhexyl) anisoylphosphonate, dineopentyl anisoylphosphonate, bis(cyclohexylmethyl) anisoylphosphonate, dibenzyl anisoylphosphonate, dicyclobutyl anisoylphosphonate, dicyclopentyl anisoylphosphonate, dicyclohexyl anisoylphosphonate, diphenyl anisoylphosphonate, ditolyl anisoylphosphonate, dinaphthyl anisoylphosphonate, diallyl anisoylphosphonate, dimethallyl anisoylphosphonate, and dicrotyl anisoylphosphonate.

Suitable dihydrocarbyl naphthoylphosphonates include dimethyl naphthoylphosphonate, diethyl naphthoylphosphonate, di-n-propyl naphthoylphosphonate diisopropyl naphthoylphosphonate, di-n-butyl naphthoylphosphonate, diisobutyl naphthoylphosphonate, di-t-butyl naphthoylphosphonate, bis(2,2,2-trifluoroethyl) naphthoylphosphonate, bis(2,4-dimethyl-3-pentyl) naphthoylphosphonate, bis(2-ethylhexyl) naphthoylphosphonate, dineopentyl naphthoylphosphonate, bis(cyclohexylmethyl) naphthoylphosphonate, dibenzyl naphthoylphosphonate, dicyclobutyl naphthoylphosphonate, dicyclopentyl naphthoylphosphonate, dicyclohexyl naphthoylphosphonate, diphenyl naphthoylphosphonate, ditolyl naphthoylphosphonate, dinaphthyl naphthoylphosphonate, diallyl naphthoylphosphonate, dimethallyl naphthoylphosphonate, and dicrotyl naphthoylphosphonate.

Cyclic α-acylphosphonate diesters contain a ring structure that is formed by a divalent organic group bridging the two oxygen atoms that are singly-bonded to the phosphorus atom. These cyclic α-acylphosphonate diesters may be represented by the following structure:

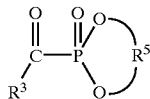

where $R^3$ is the same as defined above, and $R^5$ is a divalent organic group. Preferably, $R^3$ is a hydrocarbyl groups such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, boron, sulfur, and phosphorus atoms. Preferably, $R^5$ is a hydrocarbylene group such as, but not limited to, alkylene, substituted alkylene, cycloalkylene, substituted cycloalkylene, alkenylene, substituted alkenylene, cycloalkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, boron, sulfur, and phosphorus atoms.

Suitable types of cyclic α-acylphosphonate diesters include, but are not limited to, hydrocarbylene formylphosphonates, hydrocarbylene acetylphosphonates, hydrocarbylene propionylphosphonates, hydrocarbylene butyrylphosphonates, hydrocarbylene isobutyrylphosphonates, hydrocarbylene pivaloylphosphonates, hydrocarbylene 2-ethylhexanoylphosphonates, hydrocarbylene cyclohexanoylphosphonates, hydrocarbylene acryloylphosphonates, hydrocarbylene methacryloylphosphonates, hydrocarbylene crotonylphosphonates, hydrocarbylene benzoylphosphonates, hydrocarbylene toluoylphosphonates, hydrocarbylene anisoylphosphonates, and hydrocarbylene naphthoylphosphonates. Mixtures of the above cyclic α-acylphosphonate diesters may also be utilized.

Suitable hydrocarbylene formylphosphonates include 2-oxo-2-formyl-5-butyl-5-ethyl-1,3,2-dioxaphosphorinane, 2-oxo-2-formyl-5,5-dimethyl-1,3,2-dioxaphosphorinane, 2-oxo-2-formyl-1,3,2-dioxaphosphorinane, 2-oxo-2-formyl-4-methyl-1,3,2-dioxaphosphorinane, 2-oxo-2-formyl-5-ethyl-5-methyl-1,3,2-dioxaphosphorinane, 2-oxo-2-formyl-5,5-diethyl-1,3,2-dioxaphosphorinane, 2-oxo-2-fonnyl-5-methyl-5-propyl-1,3,2-dioxaphosphorinane, 2-oxo-2-formyl-4-isopropyl-5,5-dimethyl-1,3,2-dioxaphosphorinane, 2-oxo-2-formyl-4,6-dimethyl-1,3,2-dioxaphosphorinane, 2-oxo-2-formyl-4-propyl-5-ethyl-1,3,2-dioxaphosphorinane, 2-oxo-2-formyl-4-methyl-1,3,2-dioxaphospholane, 2-oxo-2-formyl-4,5-dimethyl-1,3,2-dioxaphospholane, 2-oxo-2-formyl-4,4,5,5-tetramethyl-1,3,2-dioxaphospholane, 2-oxo-2-formyl-4,5-benzo-1,3,2-dioxaphospholane, 2-oxo-2-formyl-4,5-(3'-methylbenzo)-1,3,2-dioxaphospholane, 2-oxo-2-formyl-4,5-(4'-methylbenzo)-1,3,2-dioxaphospholane, 2-oxo-2-formyl-4,5-(4'-tert-butylbenzo)-1,3,2-dioxaphospholane, and 2-oxo-2-formyl-4,5-naphthalo-1,3,2-dioxaphospholane.

Suitable hydrocarbylene acetylphosphonates include 2-oxo-2-acetyl-5-butyl-5-ethyl-1,3,2-dioxaphosphorinane, 2-oxo-2-acetyl-5,5-dimethyl-1,3,2-dioxaphosphorinane, 2-oxo-2-acetyl-1,3,2-dioxaphosphorinane, 2-oxo-2-acetyl-4-methyl-1,3,2-dioxaphosphorinane, 2-oxo-2-acetyl-5-ethyl-5-methyl-1,3,2-dioxaphosphorinane, 2-oxo-2-acetyl-5,5-diethyl-1,3,2-dioxaphosphorinane, 2-oxo-2-acetyl-5-methyl-5-propyl-1,3,2-dioxaphosphorinane, 2-oxo-2-acetyl-4-isopropyl-5,5-dimethyl-1,3,2-dioxaphosphorinane, 2-oxo-2-acetyl-4,6-dimethyl-1,3,2-dioxaphosphorinane, 2-oxo-2-acetyl-4-propyl-5-ethyl-1,3,2-dioxaphosphorinane, 2-oxo-2-acetyl-4-methyl- 1,3,2-dioxaphospholane, 2-oxo-2-acetyl-4,5-dimethyl- 1,3,2-dioxaphospholane, 2-oxo-2-acetyl-4,4,5,5-tetramethyl-1,3,2-dioxaphospholane, 2-oxo-2-acetyl-4,5-benzo-1,3,2-dioxaphospholane, 2-oxo-2-acetyl-4,5-(3'-methylbenzo)-1,3,2-dioxaphospholane, 2-oxo-2-acetyl-4,5-(4'-methylbenzo)-1,3,2-dioxaphospholane, 2-oxo-2-acetyl-4,5- (4'-tert-butylbenzo) -1,3,2-dioxaphospholane, and 2-oxo-2-acetyl-4,5-naphthalo-1,3,2-dioxaphospholane.

Suitable hydrocarbylene isobutyrylphosphonates include 2-oxo-2-isobutyryl-5-butyl-5-ethyl-1,3,2-dioxaphosphorinane, 2-oxo-2-isobutyryl-5,5-dimethyl-1,3,2-dioxaphosphorinane, 2-oxo-2-isobutyryl-1,3,2-dioxaphosphorinane, 2-oxo-2-isobutyryl-4-methyl-1,3,2-dioxaphosphorinane, 2-oxo-2-isobutyryl-5-ethyl-5-methyl-1,3,2-dioxaphosphorinane, 2-oxo-2-isobutyryl-5,5-diethyl-1,3,2-dioxaphosphorinane, 2-oxo-2-isobutyryl-5-methyl-5-propyl-1,3,2-dioxaphosphorinane, 2-oxo-2-isobutyryl-4-isopropyl-5,5-dimethyl-1,3,2-dioxaphosphorinane, 2-oxo-2-isobutyryl-4,6-dimethyl-1,3,2-dioxaphosphorinane, 2-oxo-2-isobutyryl-4-propyl-5-ethyl-1,3,2-dioxaphosphorinane, 2-oxo-2-isobutyryl-4-methyl-1,3,2-dioxaphospholane, 2-oxo-2-isobutyryl-4,5-dimethyl-1,3,2-dioxaphospholane, 2-oxo-2-isobutyryl-4,4,5,5-tetramethyl-1,3,2-dioxaphospholane, 2-oxo-2-isobutyryl-4,5-benzo-1,3,2-dioxaphospholane, 2-oxo-2-isobutyryl-4,5-(3'-methylbenzo)-1,3,2-dioxaphospholane, 2-oxo-2-isobutyryl- 4,5-(4'-methylbenzo)-1,3,2-dioxaphospholane, 2-oxo-2-isobutyryl-4,5-(4'-tert-butylbenzo)-1,3,2-dioxaphospholane, and 2-oxo-2-isobutyryl-4,5-naphthalo-1,3,2-dioxaphospholane. Suitable hydrocarbylene pivaloylphosphonates include 2-oxo-2-pivaloyl-5-butyl-5-ethyl-1,3,2-dioxaphosphorinane, 2-oxo-2-pivaloyl-5,5-dimethyl-1,3,2-dioxaphosphorinane, 2-oxo-2-pivaloyl-1,3,2-dioxaphosphorinane, 2-oxo-2-pivaloyl-4-methyl-1,3,2-dioxaphosphorinane, 2-oxo-2-pivaloyl-5-ethyl-5-methyl-1,3,2-dioxaphosphorinane, 2-oxo-2-pivaloyl-5,5-diethyl-1,3,2-dioxaphosphorinane, 2-oxo-2-pivaloyl-5-methyl-5-propyl-1,3,2-dioxaphosphorinane, 2-oxo-2-pivaloyl-4-isopropyl-5,5-dimethyl-1,3,2-dioxaphosphorinane, 2-oxo-2-pivaloyl-4,6-dimethyl-1,3,2-dioxaphosphorinane, 2-oxo-2-pivaloyl-4-propyl-5-ethyl-1,3,2-dioxaphosphorinane, 2-oxo-2-pivaloyl-4-methyl-1,3,2-dioxaphospholane, 2-oxo-2-pivaloyl-4,5-dimethyl-1,3,2-dioxaphospholane, 2-oxo-2-pivaloyl-4,4,5,5-tetramethyl-1,3,2-dioxaphospholane, 2-oxo-2-pivaloyl-4,5-benzo-1,3,2-dioxaphospholane, 2-oxo-2-pivaloyl-4,5-(3'-methylbenzo)-1,3,2-dioxaphospholane, 2-oxo-2-pivaloyl-4,5-(4'-methylbenzo)-1,3,2-dioxaphospholane, 2-oxo-2-pivaloyl-4,5-(4'-tert-butylbenzo)-1,3,2-dioxaphospholane, and 2-oxo-2-pivaloyl-4,5-naphthalo-1,3,2-dioxaphospholane.

Suitable hydrocarbylene cyclohexanoylphosphonates include 2-oxo-2-cyclohexanoyl-5-butyl-5-ethyl-1,3,2-dioxaphosphorinane, 2-oxo-2-cyclohexanoyl-5,5-dimethyl-1,3,2-dioxaphosphorinane, 2-oxo-2-cyclohexanoyl-1,3,2-dioxaphosphorinane, 2-oxo-2-cyclohexanoyl-4-methyl-1,3,2-dioxaphosphorinane, 2-oxo-2-cyclohexanoyl-5-ethyl-5-methyl-1,3,2-dioxaphosphorinane, 2-oxo-2-cyclohexanoyl-5,5-diethyl-1,3,2-dioxaphosphorinane, 2-oxo-2-cyclohexanoyl-5-methyl-5-propyl-1,3,2-dioxaphosphorinane, 2-oxo-2-cyclohexanoyl-4-isopropyl-5,5-dimethyl-1,3,2-dioxaphosphorinane, 2-oxo-2-cyclohexanoyl-4,6-dimethyl-1,3,2-dioxaphosphorinane, 2-oxo-2-cyclohexanoyl-4-propyl-5-ethyl-1,3,2-dioxaphosphorinane, 2-oxo-2-cyclohexanoyl-4-methyl-1,3,2-dioxaphospholane, 2-oxo-2-cyclohexanoyl-4,5-dimethyl-1,3,2-dioxaphospholane, 2-oxo-2-cyclohexanoyl-4,4,5,5-tetramethyl-1,3,2-dioxaphospholane, 2-oxo-2-cyclohexanoyl-4,5-benzo-1,3,2-dioxaphospholane, 2-oxo-2-cyclohexanoyl-4,5-(3'-methylbenzo)-1,3,2-dioxaphospholane, 2-oxo-2-cyclohexanoyl-4,5-(4'-methylbenzo)-1,3,2-dioxaphospholane, 2-oxo-2-cyclohexanoyl-4,5-(4'-tertbutylbenzo)-1,3,2-dioxaphospholane, and 2-oxo-2-cyclohexanoyl-4,5-naphthalo-1,3,2-dioxaphospholane.

Suitable hydrocarbylene acryloylphosphonates include 2-oxo-2-acryloyl-5-butyl-5-ethyl-1,3,2-dioxaphosphorinane, 2-oxo-2-acryloyl-5,5-dimethyl-1,3,2-dioxaphosphorinane, 2-oxo-2-acryloyl-1,3,2-dioxaphosphorinane, 2-oxo-2-acryloyl-4-methyl-1,3,2-dioxaphosphorinane, 2-oxo-2-acryloyl-5-ethyl-5-methyl-1,3,2-dioxaphosphorinane, 2-oxo-2-acryloyl-5,5-diethyl-1,3,2-dioxaphosphorinane, 2-oxo-2-acryloyl-5-methyl-5-propyl-1,3,2-dioxaphosphorinane, 2-oxo-2-acryloyl-4-isopropyl-5,5-dimethyl-1,3,2-dioxaphosphorinane, 2-oxo-2-acryloyl-4,6-dimethyl-1,3,2-dioxaphosphorinane, 2-oxo-2-acryloyl-4-propyl-5-ethyl-1,3,2-dioxaphosphorinane, 2-oxo-2-acryloyl-4-methyl-1,3,2-dioxaphospholane, 2-oxo-2-acryloyl-4,5-dimethyl-1,3,2-dioxaphospholane, 2-oxo-2-acryloyl-4,4,5,5-tetramethyl-1,3,2-dioxaphospholane, 2-oxo-2-acryloyl-4,5-benzo-1,3,2-dioxaphospholane, 2-oxo-2-acryloyl-4,5-(3'-methylbenzo)-1,3,2-dioxaphospholane, 2-oxo-2-acryloyl-4,5-(4'-methylbenzo)-1,3,2-dioxaphospholane, 2-oxo-2-acryloyl-4,5-(4'-tertbutylbenzo)-1,3,2-dioxaphospholane, and 2-oxo-2-acryloyl-4,5-naphthalo-1,3,2-dioxaphospholane.

Suitable hydrocarbylene benzoylphosphonates include 2-oxo-2-benzoyl-5-butyl-5-ethyl-1,3,2-dioxaphosphorinane, 2-oxo-2-benzoyl-5,5-dimethyl-1,3,2-dioxaphosphorinane, 2-oxo-2-benzoyl-1,3,2-dioxaphosphorinane, 2-oxo-2-benzoyl-4-methyl-1,3,2-dioxaphosphorinane, 2-oxo-2-benzoyl-5-ethyl-5-methyl-1,3,2-dioxaphosphorinane, 2-oxo-2-benzoyl-5,5-diethyl-1,3,2-dioxaphosphorinane, 2-oxo-2-benzoyl-5-methyl-5-propyl-1,3,2-dioxaphosphorinane, 2-oxo-2-benzoyl-4-isopropyl-5,5-dimethyl-1,3,2-dioxaphosphorinane, 2-oxo-2-benzoyl-4,6-dimethyl-1,3,2-dioxaphosphorinane, 2-oxo-2-benzoyl-4-propyl-5-ethyl-1,3,2-dioxaphosphorinane, 2-oxo-2-benzoyl-4-methyl-1,3,2-dioxaphospholane, 2-oxo-2-benzoyl-4,5-dimethyl-1,3,2-dioxaphospholane, 2-oxo-2-benzoyl-4,4,5,5-tetramethyl-1,3,2-dioxaphospholane, 2-oxo-2-benzoyl-4,5-benzo-1,3,2-dioxaphospholane, 2-oxo-2-benzoyl-4,5-(3'-methylbenzo)-1,3,2-dioxaphospholane, 2-oxo-2-benzoyl-4,5-(4-methylbenzo)-1,3,2-dioxaphospholane, 2-oxo-2-benzoyl-4,5-(4'-tert-butylbenzo)-1,3,2-dioxaphospholane, and 2-oxo-2-benzoyl-4,5-naphthalo-1,3,2-dioxaphospholane.

The catalyst composition of this invention has very high catalytic activity over a wide range of catalyst concentrations and catalyst ingredient ratios. The polymers having the most desirable properties, however, are obtained within a narrower range of catalyst concentrations and catalyst ingredient ratios. Further, the three catalyst ingredients (a), (b), and (c) may interact to form an active catalyst species. Accordingly, the optimum concentration for any one catalyst ingredient is dependent upon the concentrations of the other catalyst ingredients. The molar ratio of the organomagnesium compound to the iron-containing compound (Mg/Fe) can be varied from about 1:1 to about 50:1, more preferably from about 2:1 to about 30:1, and even more preferably from about 3:1 to about 20:1. The molar ratio of the α-acylphosphonate diester to the iron-containing compound (P/Fe) can be varied from about 0.5:1 to about 50:1, more preferably from about 1:1 to about 25:1, and even more preferably from about 2:1 to about 10:1.

The catalyst composition is formed by combining or mixing the three catalyst ingredients (a), (b), and (c). Although an active catalyst species is believed to result from this combination, the degree of interaction or reaction between the various ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The catalyst composition can be formed by using one of the following methods:

First, the catalyst composition may be formed in situ by adding the three catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the organomagnesium compound is added first, followed by the iron-containing compound, and then followed by the α-acylphosphonate diester.

Second, the three catalyst ingredients may be pre-mixed outside the polymerization system at an appropriate temperature, which is generally from about −20° C. to about 80° C., and the resulting catalyst composition is then added to the monomer solution.

Third, the catalyst composition may be pre-formed in the presence of conjugated diene monomer. That is, the three catalyst ingredients are pre-mixed in the presence of a small amount of conjugated diene monomer at an appropriate temperature, which is generally from about −20° C. to about 80° C. The amount of conjugated diene monomer that is used for pre-forming the catalyst can range from about 1 to about 500 moles per mole of the iron-containing compound, more preferably from about 5 to about 250 moles per mole of the iron-containing compound, and even more preferably from about 10 to about 100 moles per mole of the iron-containing compound. The resulting catalyst composition is then added to the remainder of the conjugated diene monomer that is to be polymerized.

Fourth, the catalyst composition may be formed by using a two-stage procedure. The first stage involves reacting the iron-containing compound with the organomagnesium compound in the presence of a small amount of conjugated diene monomer at an appropriate temperature, which is generally from about −20° C. to about 80° C. In the second stage, the foregoing reaction mixture and the α-acylphosphonate diester are charged in either a stepwise or simultaneous manner to the remainder of the conjugated diene monomer that is to be polymerized.

Fifth, an alternative two-stage procedure may also be employed. An iron-ligand complex is first formed by pre-combining the iron-containing compound with the α-acylphosphonate diester. Once formed, this iron-ligand complex is then combined with the organomagnesium compound to form the active catalyst species. The iron-ligand complex can be formed separately or in the presence of the conjugated diene monomer that is to be polymerized. This complexation reaction can be conducted at any convenient temperature at normal pressure, but for an increased rate of reaction, it is preferable to perform this reaction at room temperature or above. The time required for the formation of the iron-ligand complex is usually within the range of about 10 minutes to about 2 hours after mixing the iron-containing compound with the α-acylphosphonate diester. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. It is normally desirable to select an organic solvent that is inert with respect to the catalyst composition. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, mineral spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The catalyst composition exhibits very high catalytic activity for the polymerization of conjugated diene monomers. Specific examples of conjugated diene monomers that can be polymerized include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. The preferred conjugated diene monomers are 1,3-butadiene, isoprene, 1,3-pentadiene, and 1,3-hexadiene. The most preferred conjugated diene monomer is 1,3-butadiene. A preferred embodiment of this invention is directed toward the polymerization of 1,3-butadiene into syndiotactic 1,2-polybutadiene or atactic 1,2-polybutadiene.

The production of conjugated diene polymers is accomplished by polymerizing conjugated diene monomers in the presence of a catalytically effective amount of the foregoing catalyst composition. The total catalyst concentration to be employed in the polymerization mass depends on the interplay of various factors such as the purity of the catalyst ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. Generally, the amount of the iron-containing compound used can be varied from about 0.01 to about 2 mmol per 100 g of conjugated diene monomer, more preferably from about 0.02 to about 1.0 mmol per 100 g of conjugated monomer, and even more preferably from about 0.05 to about 0.5 mmol per 100 g of conjugated diene monomer.

The polymerization of conjugated diene monomers is preferably carried out in an organic solvent as the diluent. Accordingly, a solution polymerization system may be employed in which both the monomer to be polymerized and the polymer formed are soluble in the polymerization medium. Alternatively, a precipitation polymerization system may be employed by choosing a solvent in which the polymer formed is insoluble. In both cases, an amount of organic solvent in addition to the amount of organic solvent that may be used in preparing the catalyst composition is usually added to the polymerization system. The additional organic solvent may be the same as or different from the organic solvent used in preparing the catalyst composition. It is normally desirable to select an organic solvent that is inert with respect to the catalyst composition employed to catalyze the polymerization. Exemplary hydrocarbon solvents have been set forth above. When a solvent is employed, the concentration of the conjugated monomer to be polymerized is not limited to a special range. Preferably, however, the concentration of the 1,3-butadiene monomer present in the polymerization medium at the beginning of the polymerization should be in a range of from about 3% to about 80% by weight, more preferably from about 5% to about 50% by weight, and even more preferably from about 10% to about 30% by weight.

The polymerization of conjugated diene monomers may also be carried out by means of bulk polymerization, which refers to a polymerization environment where no solvents are employed. The bulk polymerization can be conducted either in a condensed liquid phase or in a gas phase.

In performing the polymerization of conjugated diene monomers, a molecular weight regulator may be employed to control the molecular weight of the polymer to be produced. As a result, the scope of the polymerization system can be expanded in such a manner that it can be used for the production of conjugated diene polymers having a wide range of molecular weights. Suitable types of molecular weight regulators that can be utilized include, but are not limited to, α-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene, and vinylacetylene; and mixtures thereof. The amount of the molecular weight regulator used, expressed in parts per hundred parts by weight of the conjugated diene monomer (phm), is from about 0.01 to about 10 phm, preferably from about 0.02 to about 2 phm, and more preferably from about 0.05 to about 1 phm.

The molecular weight of the polymer to be produced can also be effectively controlled by conducting the polymerization of conjugated diene monomers in the presence of hydrogen gas. In this case, the partial pressure of hydrogen gas is preferably from about 0.01 to about 50 atmospheres.

The polymerization of conjugated diene monomers may be carried out as a batch process, a continuous process, or a semi-continuous process. In the semi-continuous process, monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before or after the addition of the terminator. The amount of the antioxidant employed is usually in the range of 0.2% to 1% by weight of the polymer product. When the polymerization has been stopped, the polymer can be recovered from the polymerization mixture by utilizing conventional procedures of desolventization and drying. For instance, the polymer may be isolated from the polymerization mixture by coagulation of the polymerization mixture with an alcohol such as methanol, ethanol, or isopropanol, followed by filtration, or by steam distillation of the solvent and the unreacted monomer, followed by filtration. The isolated polymer is then dried to remove residual amounts of solvent and water. Alternatively, the polymer may be isolated from the polymerization mixture by directly drum drying the polymerization cement.

Advantageously, the iron-based catalyst composition can be manipulated to vary the characteristics of the resulting conjugated diene polymer. For example, in a preferred embodiment of this invention where 1,3-butadiene is polymerized into polybutadiene, the characteristics of the resulting polybutadiene can be controlled by varying the molar ratio of the organomagnesium compound to the iron-containing compound. Namely, when the molar ratio of the organomagnesium compound to the iron-containing compound is relatively low (e.g., 6:1 or less), atactic 1,2-polybutadiene is formed. On the other hand, when the molar ratio of the organomagnesium compound to the iron-containing compound is relatively high (e.g., 8:1 or more), syndiotactic 1,2-polybutadiene is formed. Further, by selecting an intermediate molar ratio of the organomagnesium compound to the iron-containing compound (e.g., 7:1), it is also possible to prepare a blend of syndiotactic 1,2-polybutadiene and atactic 1,2-polybutadiene.

The conjugated diene polymers produced with the catalyst composition of this invention have many uses. For example, the atactic 1,2-polybutadiene can be utilized in rubber compositions that are used to manufacture tire treads having the optimum balance of traction, wear, and rolling resistance. The syndiotactic 1,2-polybutadiene can be blended into and co-cured with various natural or synthetic rubbers in order to improve the properties thereof. For example, the syndiotactic 1,2-polybutadiene can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear resistance of tire treads. The syndiotactic 1,2-polybutadiene is also useful in the manufacture of films and packaging materials and in many molding applications.

In order to demonstrate the practice of the present invention, the following examples have been prepared and tested. The examples should not, however, be viewed as limiting the scope of the invention. The claims will serve to define the invention.

EXAMPLES

Example 1

In this experiment, diethyl acetylphosphonate (formula:$CH_3C(O)P(O)(OEt)_2$) was synthesized by reacting acetyl chloride ($CH_3COCl$) with triethyl phosphite ($P(OEt)_3$).

To triethyl phosphite (109.0 g, 0.655 mol), stirred in a 250-mL round-bottom flask under argon, was added dropwise acetyl chloride (51.4 g, 0.655 mol) over a period of about 30 minutes while the reaction mixture was cooled with an ice-bath. The mixture was stirred at room temperature for 1 hour and then heated at 70° C. for 1 hour. The reaction flask was then connected to a distillation head and a receiving flask. The ethyl chloride formed in the reaction was removed by distillation at atmospheric pressure. The remaining crude product was purified by vacuum distillation at 65–70° C. and a pressure of 1 torr, yielding diethyl acetylphosphonate as a colorless liquid (86.6 g, 73% yield). The proper identity of the product was established by nuclear magnetic resonance (NMR) and infrared (IR) spectroscopic analyses. $^1$H NMR data (CDCl$_3$, 25° C., referenced to tetramethylsilane): δ 4.20 (multiplet, 4 H, OCH$_2$), 2.47 (doublet, $^3J_{HP}$=5.2 Hz, 3 H, CH$_3$CO), 1.36 (triplet, $^3J_{HH}$=7.1 Hz, 6 H, CH$_2$CH$_3$). $^{13}$p NMR data (CDCl$_3$, 25° C., referenced to 85% H$_3$PO$_4$): δ −3.22. IR data (neat liquid film): ν(C=O) 1700 cm$^{-1}$, ν(P=O) 1255 cm$^{-1}$, ν(P—O) 1020 cm$^{-1}$.

Example 2

An oven-dried 1-liter glass bottle was capped with a self-sealing rubber liner and a perforated metal cap. After the bottle was thoroughly purged with a stream of dry nitrogen gas, the bottle was charged with 227 g of a 1,3-butadiene/hexanes blend containing 22.0% by weight of 1,3-butadiene. The following catalyst ingredients were then added to the bottle in the following order: (1) 0.40 mmol of dibutylmagnesium, (2) 0.10 mmol of iron(III) 2-ethylhexanoate, and (3) 0.40 mmol of diethyl acetylphosphonate. The bottle was tumbled for 17 hours in a water bath maintained at 65° C. The polymerization mixture was coagulated with 3 liters of isopropanol containing 2,6-di-tert-butyl-4-methylphenol as the antioxidant. The resulting atactic 1,2-polybutadiene was isolated by filtration and dried to a constant weight under vacuum at 60° C. The yield of the polymer was 36.8 g (74% yield). As measured by differential scanning calorimetry (DSC), the polymer had a glass transition temperature of −30° C. and had no detectable melting temperature. The infrared (IR) spectroscopic analysis of the polymer indicated a 1,2-linkage content of 66.0%, a cis-1,4-linkage content of 31.7%, and a trans-1,4-linkage content of 2.3. As determined by gel permeation chromatography (GPC), the polymer had a number average molecular weight ($M_n$) of 180,000, a weight average molecular weight ($M_w$) of 388,000, and a polydispersity index ($M_w/M_n$) of 2.2. The monomer charge, the amounts of the catalyst ingredients, and the properties of the resulting atactic 1,2-polybutadiene are summarized in Table I.

TABLE I

| Example No. | 2 | 3 | 4 |
|---|---|---|---|
| 22.0% 1,3-Bd/hexanes (g) | 227 | 227 | 227 |
| MgBu$_2$ 2 (mmol) | 0.40 | 0.50 | 0.60 |
| Fe(III) 2-ethylhexanoate (mmol) | 0.10 | 0.10 | 0.10 |
| CH$_3$C(O)P(O)(OEt)$_2$ (mmol) | 0.40 | 0.40 | 0.40 |
| Fe/Mg/P molar ratio | 1:4:4 | 1:5:4 | 1:6:4 |
| Polymer yield after 17 hr at 65° C. | 74% | 78% | 83% |
| Glass transition temperature (° C.) | −30 | −27 | −27 |
| Polymer microstructure: | | | |
| 1,2-linkage content (%) | 66.0 | 69.9 | 72.9 |
| cis-1,4-linkage content (%) | 31.7 | 28.4 | 26.4 |
| trans-1,4-linkage content (%) | 2.3 | 1.7 | 0.7 |
| $M_n$ | 180,000 | 186,000 | 181,000 |
| $M_w$ | 388,000 | 449,000 | 422,000 |
| $M_w/M_n$ | 2.2 | 2.4 | 2.3 |

Examples 3 and 4

In Examples 3 and 4, the procedure described in Example 2 was repeated except that the catalyst ingredient ratio was varied as shown in Table I. The monomer charge, the amounts of the catalyst ingredients, and the properties of the resulting atactic 1,2-polybutadiene are summarized in Table I.

Examples 5–7

In Examples 5–7, the procedure described in Examples 2–4 was repeated except that higher molar ratios of dibutylmagnesium to iron(III) 2-ethylhexanoate were used as shown in Table II. In these experiments, the resulting polymer is crystalline syndiotactic 1,2-polybutadiene instead of amorphous atactic 1,2-polybutadiene. The DSC analysis of the polymer samples showed a melting temperature. The monomer charge, the amounts of the catalyst ingredients, and the properties of the resulting syndiotactic 1,2-polybutadiene are summarized in Table II. The $^1$H and $^{13}$C NMR spectroscopic analyses of the polymer produced in Example 7 indicated a 1,2-linkage content of 79.2% and a syndiotacticity of 77.7%.

TABLE II

| Example No. | 5 | 6 | 7 |
|---|---|---|---|
| 22.0% 1,3-Bd/hexanes (g) | 227 | 227 | 227 |
| MgBU$_2$ (mmol) | 0.80 | 0.90 | 1.00 |
| Fe(III) 2-ethylhexanoate (mmol) | 0.10 | 0.10 | 0.10 |
| CH$_3$C(O)P(O)(OEt)$_2$ (mmol) | 0.40 | 0.40 | 0.40 |
| Fe/Mg/P molar ratio | 1:8:4 | 1:9:4 | 1:10:4 |
| Polymer yield after 17 hr at 65° C. | 69% | 60% | 57% |
| Melting temperature (° C.) | 163 | 165 | 165 |
| $M_n$ | 117,000 | 146,000 | 172,000 |
| $M_w$ | 406,000 | 408,000 | 365,000 |
| $M_w/M_n$ | 3.4 | 2.8 | 2.1 |

Comparison of the results obtained in Examples 2–4 with the results obtained in Examples 5–7 shows that the characteristics of the polymer synthesized with the catalyst composition of this invention can be controlled by varying the ratio of the organomagnesium compound to the iron-containing compound. As a general rule, lower ratios of the organomagnesium compound to the iron-containing compound promote the formation of amorphous atactic 1,2-polybutadiene, whereas higher ratios of the organomagnesium compound to the iron-containing compound promote the formation of crystalline syndiotactic 1,2-polybutadiene.

Examples 8–10

In Examples 8–10, the procedure described in Example 2 was repeated except that iron(III) acetylacetonate was substituted for iron(III) 2-ethylhexanoate, and the catalyst ingredient ratio was varied as shown in Table III. The monomer charge, the amounts of the catalyst ingredients, and the properties of the resulting atactic 1,2-polybutadiene are summarized in Table III.

TABLE III

| Example No. | 8 | 9 | 10 |
|---|---|---|---|
| 22.0% 1,3-Bd/hexanes (g) | 227 | 227 | 227 |
| MgBu$_2$ (mmol) | 0.50 | 0.60 | 0.70 |
| Iron(III) acetylacetonate (mmol) | 0.10 | 0.10 | 0.10 |
| CH$_3$C(O)P(O)(OEt)$_2$ (mmol) | 0.40 | 0.40 | 0.40 |
| Fe/Mg/P molar ratio | 1:5:4 | 1:6:4 | 1:7:4 |
| Polymer yield after 17 hr at 65° C. | 82% | 88% | 93% |
| Glass transition temperature (° C.) | −25 | −26 | −25 |

TABLE III-continued

| Example No. | 8 | 9 | 10 |
|---|---|---|---|
| Polymer microstructure: | | | |
| 1,2-linkage content (%) | 70.3 | 69.4 | 73.0 |
| cis-1,4-linkage content (%) | 27.6 | 28.2 | 25.2 |
| trans-1,4-linkage content (%) | 2.0 | 2.4 | 1.8 |
| $M_n$ | 144,000 | 151,000 | 139,000 |
| $M_w$ | 329,000 | 331,000 | 314,000 |
| $M_w/M_n$ | 2.3 | 2.2 | 2.3 |

Examples 11–12

In Examples 11–13, the procedure described in Examples 8–10 was repeated except that higher molar ratios of dibutylmagnesium to iron(III) acetylacetonate were used as shown in Table IV. In these experiments, the resulting polymer is crystalline syndiotactic 1,2-polybutadiene instead of amorphous atactic 1,2-polybutadiene. The DSC analysis of the polymer showed a melting temperature. The monomer charge, the amounts of the catalyst ingredients, and the properties of the resulting syndiotactic 1,2-polybutadiene are summarized in Table IV.

TABLE IV

| Example No. | 11 | 12 |
|---|---|---|
| 22.0% 1,3-Bd/hexanes (g) | 227 | 227 |
| MgBu$^2$ (mmol) | 0.90 | 1.00 |
| Iron(III) acetylacetonate (mmol) | 0.10 | 0.10 |
| CH$_3$C(O)P(O)(OEt)$_2$ (mmol) | 0.40 | 0.40 |
| Fe/Mg/P molar ratio | 1:9:4 | 1:10:4 |
| Polymer yield after 17 hr at 65° C. | 66% | 58% |
| Melting temperature (° C.) | 158 | 160 |
| $M_n$ | 136,000 | 128,000 |
| $M_w$ | 293,000 | 286,000 |
| $M_w/M_n$ | 2.2 | 2.2 |

Comparison of the results obtained in Examples 8–10 with the results obtained in Examples 11–12 shows that the characteristics of the polymer synthesized with the catalyst composition of this invention can be controlled by varying the ratio of the organomagnesium compound to the iron-containing compound.

Examples 13–15

In Examples 13–15, the procedure described in Example 2 was repeated except that iron(III) bis(2-ethylhexyl) phosphate (Fe(DEHPA)$_3$) was substituted for iron(III) 2-ethylhexanoate, and the catalyst ingredient ratio was varied as shown in Table V. The monomer charge, the amounts of the catalyst ingredients, and the properties of the resulting atactic 1,2-polybutadiene are summarized in Table V.

TABLE V

| Example No. | 13 | 14 | 15 |
|---|---|---|---|
| 22.0% 1,3-Bd/hexanes (g) | 227 | 227 | 227 |
| MgBu$_2$ (mmol) | 0.40 | 0.50 | 0.60 |
| Fe(DEHPA)$_3$ (mmol) | 0.10 | 0.10 | 0.10 |
| CH$_3$C(O)P(O)(OEt)$_2$ (mmol) | 0.40 | 0.40 | 0.40 |
| Fe/Mg/P molar ratio | 1:4:4 | 1:5:4 | 1:6:4 |
| Polymer yield after 17 hr at 65° C. | 93% | 92% | 96% |
| Glass transition temperature (° C.) | −33 | −32 | −29 |

TABLE V-continued

| Example No. | 13 | 14 | 15 |
|---|---|---|---|
| Polymer microstructure: | | | |
| 1,2-linkage content (%) | 66.6 | 68.4 | 63.8 |
| cis-1,4-linkage content (%) | 29.2 | 29.4 | 34.3 |
| trans-1,4-linkage content (%) | 4.2 | 2.2 | 1.9 |

Examples 16–18

In Examples 16-18, the procedure described in Examples 13–15 was repeated except that higher molar ratios of dibutylmagnesium to iron(III) bis(2-ethylhexyl) phosphate (Fe(DEHPA)$_3$) were used as shown in Table VI. In these experiments, the resulting polymer is crystalline syndiotactic 1,2-polybutadiene instead of amorphous atactic 1,2-polybutadiene. The DSC analysis of the polymer samples showed a melting temperature. The monomer charge, the amounts of the catalyst ingredients, and the properties of the resulting syndiotactic 1,2-polybutadiene are summarized in Table VI.

TABLE VI

| Example No. | 16 | 17 | 18 |
|---|---|---|---|
| 22.0% 1,3-Bd/hexanes (g) | 227 | 227 | 227 |
| MgBu$_2$ (mmol) | 0.80 | 0.90 | 1.00 |
| Iron(III) acetylacetonate (mmol) | 0.10 | 0.10 | 0.10 |
| CH$_3$C(O)P(O)(OEt)$_2$ (mmol) | 0.40 | 0.40 | 0.40 |
| Fe/Mg/P molar ratio | 1:8:4 | 1:9:4 | 1:10:4 |
| Polymer yield after 17 hr at 65° C. | 80% | 79% | 87% |
| Melting temperature (° C.) | 159 | 163 | 161 |

Comparison of the results obtained in Examples 13–15 with the results obtained in Examples 16–18 shows that the characteristics of the polymer synthesized with the catalyst composition of this invention can be controlled by varying the ratio of the organomagnesium compound to the iron-containing compound.

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients comprising:

(a) an iron-containing compound;

(b) an organomagnesium compound; and (c) an α-acylphosphonate diester.

2. The catalyst composition of claim 1, where said iron-containing compound is an iron carboxylate, iron organophosphate, iron organophosphonate, iron organophosphinate, iron carbamate, iron dithiocarbamate, iron xanthate, iron β-diketonate, iron alkoxide, iron aryloxide, iron halide, iron pseudo-halide, iron oxyhalide, organoiron compound, or mixture thereof.

3. The catalyst composition of claim 1, where said α-acylphosphonate diester is an acyclic α-acylphosphonate diester defined by the following structure:

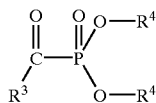

where $R^3$ is a hydrogen atom or a mono-valent organic group, and where each $R^4$, which may be the same or different, is a mono-valent organic group.

4. The catalyst composition of claim 3, where $R^3$ is a hydrogen or an alkyl, cycloalkyl, substituted cycloalkyl, alkenyl, cycloalkenyl, substituted cycloalkenyl, aryl, substituted aryl, aralkyl, alkaryl, allyl, or alkynyl group, and where each $R^4$, which may be the same or different, is an alkyl, cycloalkyl, substituted cycloalkyl, alkenyl, cycloalkenyl, substituted cycloalkenyl, aryl, substituted aryl, aralkyl, alkaryl, allyl, or alkynyl group.

5. The catalyst composition of claim 4, where said acyclic α-acylphosphonate diester is a dihydrocarbyl formylphosphonate, dihydrocarbyl acetylphosphonate, dihydrocarbyl propionylphosphonate, dihydrocarbyl butyrylphosphonate, dihydrocarbyl isobutyrylphosphonate, dihydrocarbyl pivaloylphosphonate, dihydrocarbyl 2-ethylhexanoylphosphonate, dihydrocarbyl cyclohexanoylphosphonate, dihydrocarbyl acryloylphosphonate, dihydrocarbyl methacryloylphosphonate, dihydrocarbyl crotonylphosphonate, dihydrocarbyl benzoylphosphonate, dihydrocarbyl toluoylphosphonate, dihydrocarbyl anisoylphosphonate, or dihydrocarbyl naphthoylphosphonate.

6. The catalyst composition of claim 1, where said α-acylphosphonate diester is a cyclic α-acylphosphonate diester that is defined by the following structure:

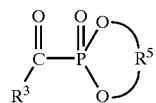

where $R^3$ is a hydrogen atom or a mono-valent organic group and $R^5$ is a divalent organic group.

7. The catalyst composition of claim 6, where $R^3$ is a hydrogen or an alkyl, cycloalkyl, substituted cycloalkyl, alkenyl, cycloalkenyl, substituted cycloalkenyl, aryl, substituted aryl, aralkyl, alkaryl, allyl, or alkynyl group, and where $R^5$ is an alkylene, substituted alkylene, cycloalkylene, substituted cycloalkylene, alkenylene, substituted alkenylene, cycloalkenylene, substituted cycloalkenylene, arylene, or substituted arylene group.

8. The catalyst composition of claim 7, where said cyclic α-acylphosphonate diester is a hydrocarbylene formylphosphonate, hydrocarbylene acetylphosphonate, hydrocarbylene propionylphosphonate, hydrocarbylene butyrylphosphonate, hydrocarbylene isobutyrylphosphonate, hydrocarbylene pivaloylphosphonate, hydrocarbylene 2-ethylhexanoylphosphonate, hydrocarbylene cyclohexanoylphosphonate, hydrocarbylene acryloylphosphonate, hydrocarbylene methacryloylphosphonate, hydrocarbylene crotonylphosphonate, hydrocarbylene benzoylphosphonate, hydrocarbylene toluoylphosphonate, hydrocarbylene anisoylphosphonate, or hydrocarbylene naphthoylphosphonate.

9. The process of claim 1, where the organomagnesium compound is represented by the general formula $MgR^1_2$ where each $R^1$, which may be the same or different, is a mono-valent organic group that is attached to the magnesium atom via a carbon atom.

10. The process of claim 9, where each $R^1$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, with each group containing up to about 20 carbon atoms.

11. The process of claim 1, where the organomagnesium compound is represented by the general formula $R^2MgX$, where $R^2$ is a mono-valent organic group that is attached to the magnesium atom via a carbon atom, and X is a hydrogen atom, a halogen atom, a carboxylate group, an alkoxide group, or an aryloxide group.

12. The process of claim 11, where $R^2$ is an alkyl, cycloalkyl, substituted cycloalkyl, alkenyl, cycloalkenyl, substituted cycloalkenyl, aryl, allyl, substituted aryl, aralkyl, alkaryl, or alkynyl group, and each group contains up to about 20 carbon atoms.

13. The process of claim 12, where the organomagnesium compound is a dihydrocarbylmagnesium or a hydrocarbylmagnesium halide.

14. The catalyst composition of claim 13, where the ingredients further comprise conjugated diene monomer.

15. The catalyst composition of claim 1, where the molar ratio of said organomagnesium compound to said iron-containing compound is from about 1:1 to about 50:1, and the molar ratio of said α-acylphosphonate diester to said iron-containing compound is from about 0.5:1 to about 50:1.

16. The catalyst composition of claim 15, where the molar ratio of said organomagnesium compound to said iron-containing compound is from about 2:1 to about 30:1, and the molar ratio of the α-acylphosphonate diester to said iron-containing compound is from about 1:1 to about 25:1.

17. A catalyst composition formed by a process comprising the step of combining:
  (a) an iron-containing compound;
  (b) an organomagnesium compound; and
  (c) an α-acylphosphonate diester.

18. The catalyst composition of claim 17, where said step of combining includes combining the iron-containing compound, the α-acylphosphonate diester, and the organomagnesium compound in the presence of conjugated diene monomer.

19. A process for forming conjugated diene polymers comprising the step of:
  polymerizing conjugated diene monomers in the presence of a catalytically effective amount of a catalyst composition formed by combining:
    (a) an iron-containing compound;
    (b) an organomagnesium compound; and
    (c) an α-acylphosphonate diester.

20. The process of claim 19, where said conjugated diene monomers consist essentially of 1,3-butadiene, thereby forming syndiotactic 1,2-polybutadiene; and where said catalytically effective amount includes from about 0.01 to about 2 mmol per 100 g of monomer.

* * * * *